United States Patent
Artz

(10) Patent No.: US 10,108,739 B2
(45) Date of Patent: Oct. 23, 2018

(54) OVERLAY CANVAS FOR COMPUTER PROGRAM APPLICATIONS

(71) Applicant: Carson Artz, Gates Mills, OH (US)

(72) Inventor: Carson Artz, Gates Mills, OH (US)

( * ) Notice: Subject to any disclaimer, the term of this patent is extended or adjusted under 35 U.S.C. 154(b) by 396 days.

(21) Appl. No.: 14/325,487

(22) Filed: Jul. 8, 2014

(65) Prior Publication Data

US 2015/0040030 A1  Feb. 5, 2015

Related U.S. Application Data

(60) Provisional application No. 61/860,589, filed on Jul. 31, 2013.

(51) Int. Cl.
*G06F 17/30* (2006.01)
*G06F 3/0484* (2013.01)
*G06F 3/0481* (2013.01)

(52) U.S. Cl.
CPC ...... *G06F 17/30905* (2013.01); *G06F 3/0481* (2013.01); *G06F 3/04842* (2013.01)

(58) Field of Classification Search
CPC .... G06F 17/30905; G06F 17/241; G06F 7/06; G06F 3/048
See application file for complete search history.

(56) References Cited

U.S. PATENT DOCUMENTS

| | | | |
|---|---|---|---|
| 6,184,886 B1 * | 2/2001 | Bates | G06F 17/30884 707/E17.114 |
| 6,697,838 B1 * | 2/2004 | Jakobson | G06F 17/30867 707/E17.109 |
| 6,760,048 B1 * | 7/2004 | Bates | G06F 3/0481 715/781 |
| 6,864,904 B1 * | 3/2005 | Ran | G06F 17/30905 707/E17.121 |
| 7,176,931 B2 * | 2/2007 | Ribak | G06F 17/30905 345/581 |
| 8,042,052 B2 * | 10/2011 | Choi | G06F 17/211 715/705 |
| 8,868,598 B2 * | 10/2014 | Zhang | G06F 17/30032 707/769 |
| 9,043,386 B2 * | 5/2015 | Halevi | G06F 17/243 709/203 |
| 2003/0182388 A1 * | 9/2003 | Alexander | G06F 9/543 709/213 |
| 2004/0078451 A1 * | 4/2004 | Dietz | G06F 17/30884 709/217 |

(Continued)

OTHER PUBLICATIONS

Definition of screenshot in English, Oxford Dictionary Online. http://www.oxforddictionaries.com/us/definition/american_english/screenshot.*

(Continued)

*Primary Examiner* — Renee D Chavez
*Assistant Examiner* — Hsiyue S Hsiao
(74) *Attorney, Agent, or Firm* — Amin, Turocy & Watson, LLP

(57) ABSTRACT

Research or background study for many creative endeavors often utilizes research methods that include browsing information online. Such is typically accomplished via a web browser. An overlay canvas can be provided over an interface associated with the browser that can be employed to store not only content associated with data presented by the browser but also context associated with that data as well as with the particular creative endeavor.

31 Claims, 18 Drawing Sheets

(56) References Cited

U.S. PATENT DOCUMENTS

| | | | | |
|---|---|---|---|---|
| 2004/0205460 A1* | 10/2004 | Gopalan | ........... | G06F 17/30876 715/205 |
| 2005/0091578 A1* | 4/2005 | Madan | .................. | G06F 17/241 715/201 |
| 2005/0193325 A1* | 9/2005 | Epstein | ............. | G06F 17/30905 715/230 |
| 2006/0075353 A1* | 4/2006 | DeSpain | ................. | G06F 17/24 715/770 |
| 2006/0218501 A1* | 9/2006 | Wilson | .................. | G06F 3/0486 715/769 |
| 2007/0266342 A1* | 11/2007 | Chang | ............... | G06F 17/30867 715/810 |
| 2008/0082910 A1* | 4/2008 | Nishino | .............. | G06F 17/2264 715/231 |
| 2009/0024962 A1* | 1/2009 | Gotz | ................. | G06F 17/30884 715/838 |
| 2009/0228480 A1* | 9/2009 | Dai | ................... | G06F 17/30899 |
| 2010/0325557 A1* | 12/2010 | Sibillo | ................. | G06F 3/0481 715/751 |
| 2014/0040862 A1* | 2/2014 | Webster | .................... | G06F 8/61 717/121 |
| 2014/0115439 A1* | 4/2014 | Delpha | ................. | G06F 17/241 715/230 |
| 2014/0214919 A1* | 7/2014 | Taylor | ................. | H04L 67/2814 709/203 |

OTHER PUBLICATIONS

Microsoft Developer Network, "Displaying the aleart pop up window at right bottom of the screen", https://social.msdn.microsoft.com/Forums/en-US/5a29e599-e39b-49d5-83f1-d4b2a6ac478a/displaying-the-aleart-pop-up-window-at-right-bottom-of-the-screen?forum=csharplanguage, See Marked as answer at Nov. 21, 2011.*

"Logic Pro 9 user manual", Apple, published on 2009, https://documentation.apple.com/en/logicpro/usermanual/index.html#chapter=11%26section=4.*

Definition of screenshot in English, Oxford Dictionary Online. Definition accessed on Aug. 6, 2016 http://www.oxforddictionaries.com/us/definition/american_english/screenshot (Year: 2016).*

* cited by examiner

OVERLAY CANVAS FOR COMPUTER PROGRAM APPLICATIONS

CROSS-REFERENCE TO RELATED APPLICATIONS

This application claims the benefit of U.S. Provisional Patent Application Ser. No. 61/860,589 filed on Jul. 31, 2013 and entitled, "OVERLAY CANVAS FOR COMPUTER PROGRAM APPLICATIONS." The entirety of this application is incorporated herein by reference.

TECHNICAL FIELD

This disclosure generally relates to a modifiable canvas that overlays a user interface associated with an application running on a device.

BACKGROUND

Ideas come in many forms, and often result from researching some aspect of the idea. Today, a significant amount of research for any given domain or purpose is accomplished with a web browser.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to an overlay canvas that can be utilized as an aid for a variety of tasks. A presentation component can be configured to present an overlay canvas that overlays a portion of a browser user interface (UI) associated with a web browser application that presents the browser UI on a device UI. A data component can be configured to, in response to selection of an interface element presented by the device UI, store to an overlay data structure content data associated with the interface element and context data associated with a context of the content data. A rendering component can be configured to facilitate rendering in the overlay canvas an overlay element that represents the interface element, wherein the rendering includes a representation of the content data and the context data.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIGS. 4A-10 provide various graphical illustrations associated with the overlay canvas detailing a variety of functional aspects or other elements in accordance with certain embodiments of this disclosure;

DETAILED DESCRIPTION

Introduction

In some embodiments, the disclosed subject matter can provide a set of tools that can be utilized to aid various types of creative work such as design work or any type of online research. Such work can range from work product of professional designers to an individual doing research on a particular topic to a personal email intended to persuade a colleague of the merits of a particular view. As an example, the set of tools can enable a person doing online research to build an interactive organizational system for their research findings or creative thoughts. Such can be accomplished while working on the web and without leaving the current screen (e.g., without switching to a different application). Rather, content, context, annotations, ideas, notes, or work product can be stored on a canvas that overlays a portion of the current web-based work space such as a web browser. Hence, the disclosed subject matter can be a smarter and more efficient way to store both content and context while gathering data online. In particular, the overlay canvas can operate as a design interface that can hover over a portion of a web browser to prolong the "flow" of surfing, seeking, and thinking while working on the computer.

Figure 15:
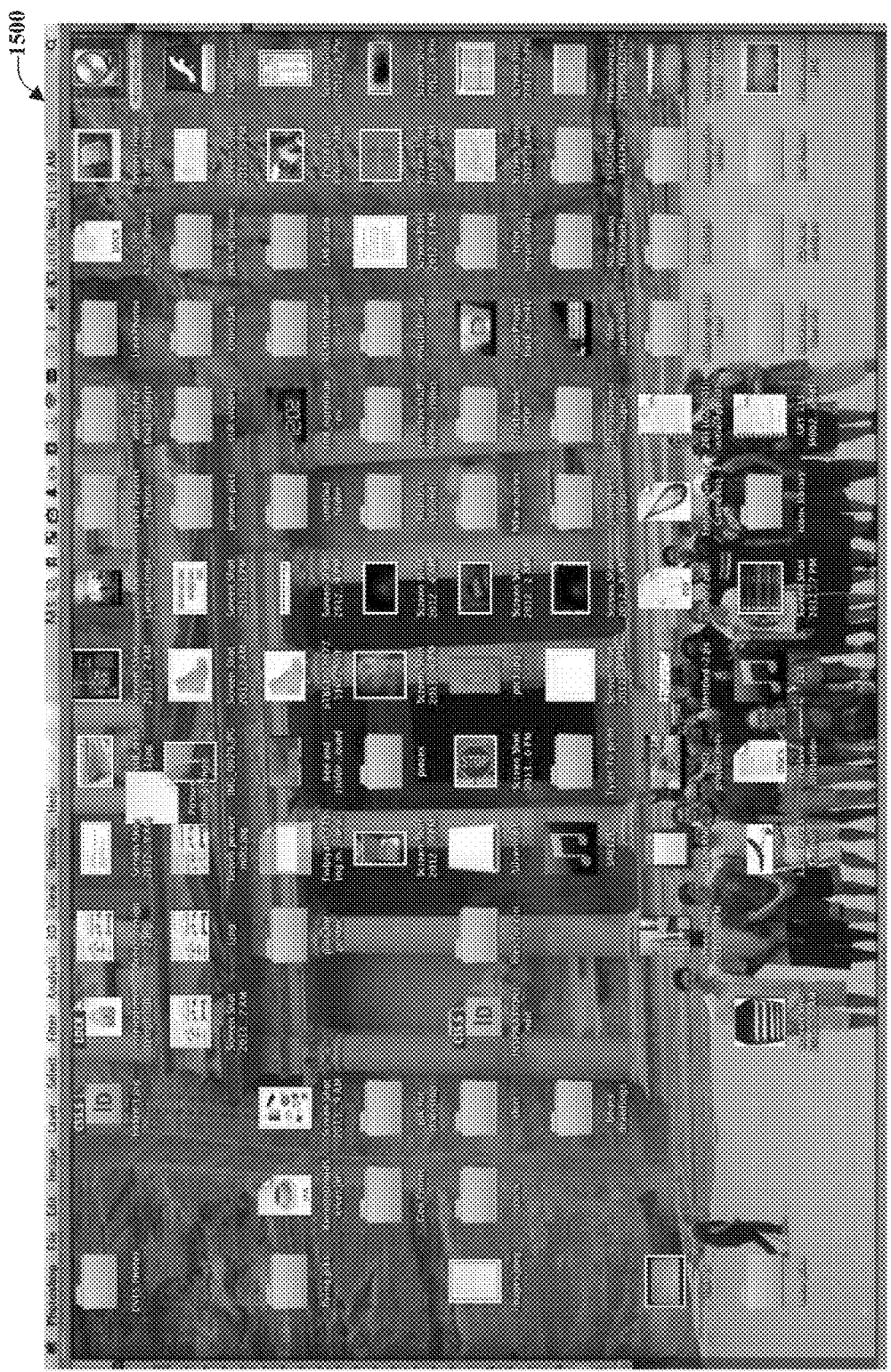
FIG. 15 provides an example graphical illustration depicting a cluttered desktop user interface that can result in inefficiencies.

Whether a researcher is seeking images for inspiration, or is gathering sources and data or both or a blogger is researching a post; the present cluttered, disorganized desktop in which most users are familiar leaves much to be desired. Such can be particularly evident in that tools used today, such as bookmarking websites of interest or dragging a uniform resource locator (URL) or other content to the desktop tends to rapidly become messy or chaotic and is further extraordinarily inefficient since such stored information tends to lose context over time. A representative example can be found at FIG. 15. As is depicted by graphical illustration 1500, a user has stored a significant number of reference links (e.g., shortcuts to applications, media, directories, hypertext links, etc.) on the desktop, ostensibly with the hope that such can provide ready access later. However, as the desktop becomes more and more cluttered, the value of these reference links is reduced and associated ideas can be lost entirely.

For example, consider the case in which a particular image on a website inspires a great idea, and so as not to forget that great idea, the user bookmarks the site or drags the image to the desktop. Unfortunately, due to all the clutter already extant on the desktop or the numerous other bookmarks, the bookmark or icon on the desktop goes overlooked for several weeks. When the user finally rediscovers the reference, e.g., during an inefficient cleaning ritual, the user is unable to remember why that particular image or bookmark was saved in the first place, much less the great idea it once inspired. Accordingly, people need a better digital toolbox that captures not just findings, but thoughts and ideas while in the moment. For example, tools that can capture not just content but also the context associated with that content.

The inventor believes that people have an array of other tools that can be used in some fashion but that these tools are not empathetic to productive online research and can limit creativity and progress. Furthermore, people often fuel creativity and abilities through a constant stream of information. How such is interpreted and stored for later consumption can be pivotal in the research process and can demand some people to be "messy" as a result. Finally, many people doing online research tend to use a specific set software tools to communicate results and ideas graphically or visually. These software tools currently act solely as a final phase of the process when there could be a creative repository working through-out all phases.

The disclosed subject matter, in some embodiments, can represent the culmination of a much research relating to methods and behaviors associated with Internet research. Creation of the disclosed subject matter involved carrying out many research methods. Observation and photography of designers at work allowed the inventor to recognize behaviors. To further investigate, the inventor critically examined over 50 designers' computer desktop screens to identify efficiency data and related patterns, from which personas were created. Thereafter, physically prototyping the experience began and interviews were conducted to test ideas and define users' needs. These prototypes allowed advance of a proof of concept from features, graphical decisions, and interface intuitiveness.

In this regard, the disclosed subject matter can aid anyone doing Internet research. Internet research is a driving force in the changes we see in the world and one needs to be equipped with adequate tools in order to operate on a higher level. Conventionally, however, nearly all information most people come across or think about will fade away over time if not properly stored. Since information from Internet research can change one's situation in instrumental ways, the later accessibility of this stored information can be vitally important. Such might apply not only to the information one collects, but to the ideas generated from that information, either of which might affect our lives in numerous ways. Unfortunately, these ideas can be lost in the shuffle and forgotten. Every idea or reference that is subject to being lost in the shuffle might instead be saved by the disclosed subject matter, potentially mitigating the loss of benefits that might otherwise occur with the loss of the idea or reference.

Thus, the disclosed subject matter has the potential to change the fundamental concept of what collecting information on one's computer means. The disclosed subject matter can change the experience to one of not just browsing and finding a method to organize but one of providing a smart place for designers to collect and organize while absorbing and generating content. The disclosed subject matter can enable a designer to quickly organize and revisit concepts. The disclosed subject matter can provide a safety net of content and context so that no idea, great or small, dissipates over time or gets lost in the shuffle.

It is understood that the disclosed subject matter need not be limited to any one field of Internet research. There also exists the opportunity to incorporate this invention in sharing applications, networks, and social media.

Example Systems that Provide an Overlay Canvas

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Figure 1A:
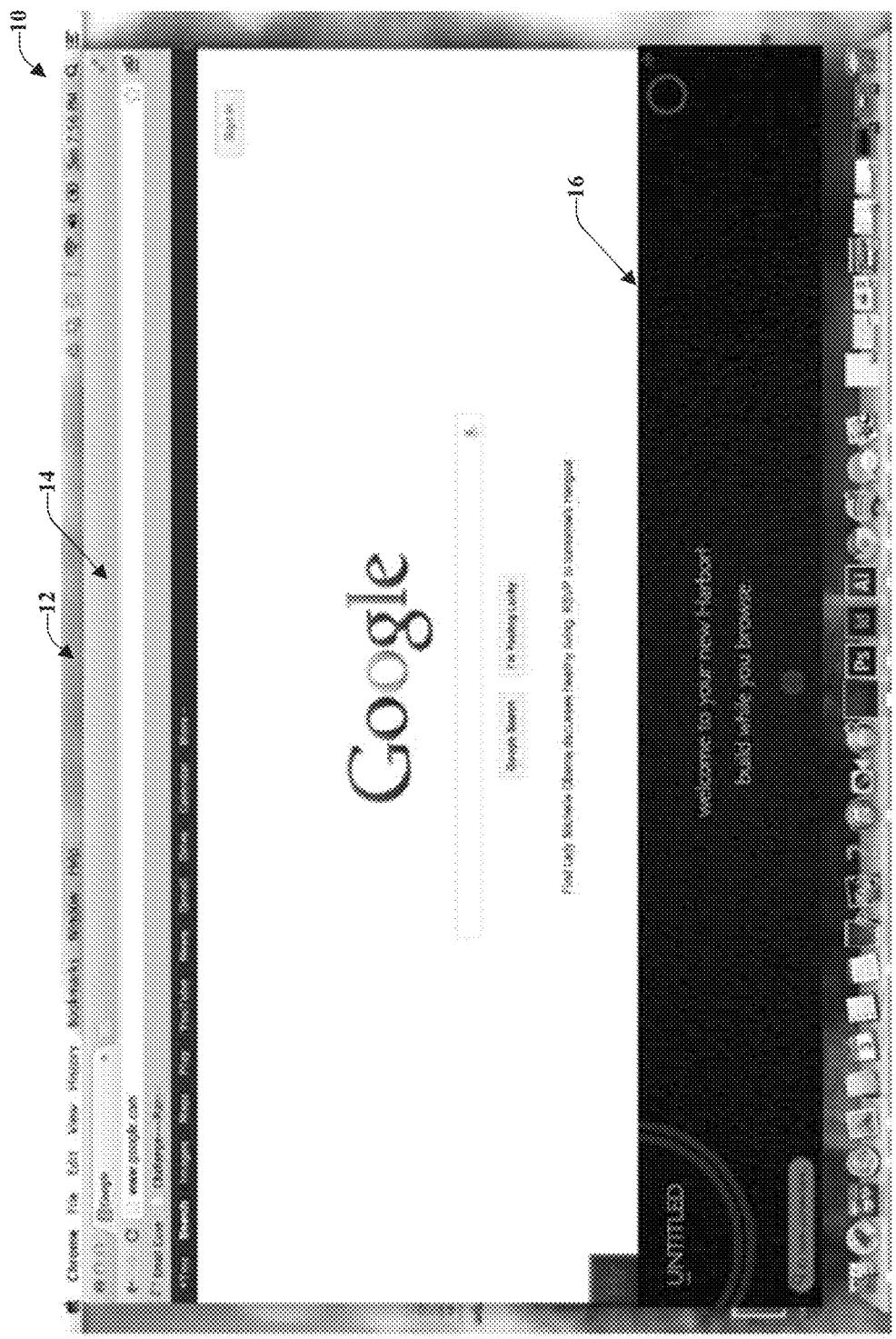
FIG. 1A provides a graphical illustration of an example overlay canvas in accordance with certain embodiments of this disclosure.

Referring now to the drawings, with initial reference to FIG. 1A, graphical illustration 10 is depicted. Graphical illustration 10 shows a representative example of some portions of the disclosed subject matter. A device user interface 12 is depicted. Device user interface 12 can include a web browser user interface 14 that is currently directed to a well-known search engine site. Web browser user interface 14 can include overlay canvas 16 (also referred to herein as a "harbor"), which is further detailed herein. It is appreciated that in some embodiments overlay canvas 16 can be included in device user interface 12.

Figure 1B:
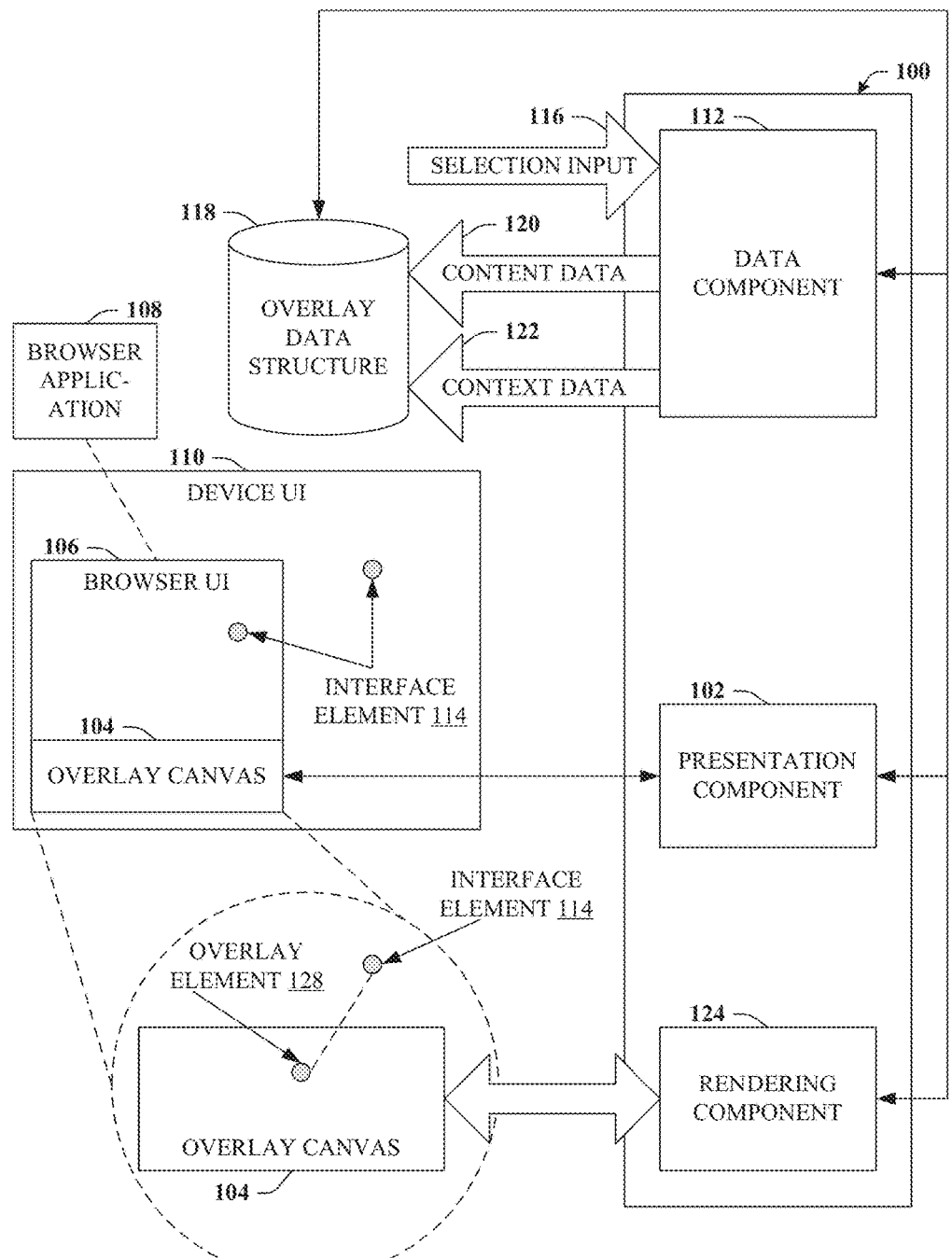
FIG. 1B illustrates a block diagram of an example system that can provide an overlay canvas in accordance with certain embodiments of this disclosure.

Referring now to FIG. 1B, a system 100 is depicted. System 100 can, inter alia, provide an overlay canvas that can retain both content and context of data presented by a user interface (UI). In some embodiments, this overlay canvas can be substantially exemplified by overlay canvas 16 of FIG. 1A. Embodiments disclosed herein can, for example, improve productivity and efficiency in connection with design, organization, or research in any suitable domain or field. System 100 can include a memory that stores computer executable components and a processor that executes computer executable components stored in the memory, examples of which can be found with reference to FIG. 13. It is to be appreciated that the computer 1302 can be used in connection with implementing one or more of the systems or components shown and described in connection with FIG. 1 and other figures disclosed herein. As depicted, system 100 can include a presentation component 102, a data component 112, and a rendering component 124.

Presentation component 102 can be configured to present overlay canvas 104. Overlay canvas 104 can overlay a portion of browser UI 106 that is associated with browser (e.g., web browser) application 108. For example, browser application 108, when executed, can present browser UI 106 on device UI 110, representing a UI of the device (not shown) that executes browser application 108. Browser UI 106 can encompass all or a portion of device UI 110 and can be in a maximized, normal, or minimized state. It is underscored that presentation component 102 can present the overlay canvas 104 during a browsing session in which browser application 108 is presenting information from a particular Internet address by way of browser UI 106. In some embodiments, the overlay canvas 104 can persist for all or most of the browsing session.

Overlay canvas 104 can represent a graphical user interface that can readily and conveniently store both content and context from research conducted via a browser UI 106. Data can be easily transferred (e.g., dragging) to overlay canvas 104 from browser UI 106 (or device UI 110) as further detailed infra. Moreover, data can be added to overlay canvas 104 and thereafter managed or interacted with in some way without leaving browser UI 106 or otherwise interrupting the creative process or otherwise being required to execute a complex or distractive sequence of operations in order to record the desired information. For example, data included in browser UI 106 can be dragged to overlay canvas 104 and dropped there, copy/pasted at overlay canvas 104 and so forth. An example of these and other described elements can be found at FIG. 1C, which can now be referenced in conjunction with FIG. 1B.

Figure 1C:
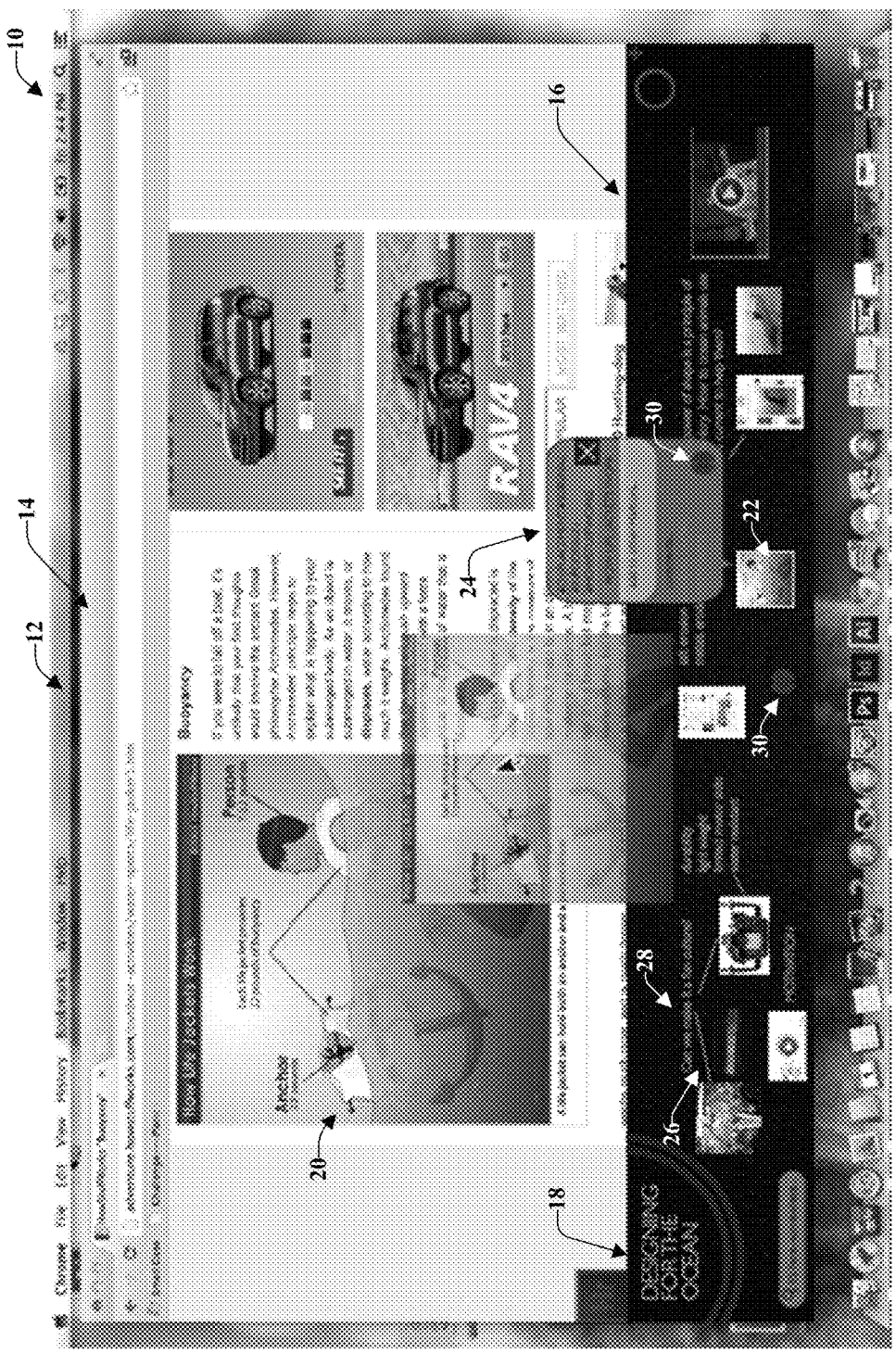
FIG. 1C provides a graphical illustration of an example overlay canvas functioning in association with a web browser in accordance with certain embodiments of this disclosure.

FIG. 1C provides graphical illustration 20, which depicts another example of some portions of the disclosed subject matter. In this embodiment, device user interface 12 is substantially similar to graphical illustration 10 of FIG. 1A, wherein device user interface 12 includes web browser user interface 14. However, in this case, web browser user interface 14 is currently directed to a web page containing information relating to life jackets and overlay canvas 16 has been captioned with the title "Designing for the Ocean," as denoted at reference numeral 18. For example, a user might be doing research relating to some aspect of life jackets, the ocean, or a subject that relates in some way to life jackets. As depicted, the user has dragged image 20 from web browser interface 14 to overlay canvas 16, situating that image 20 at location 22 of overlay canvas 16.

As illustrated, upon copying image 20 to overlay canvas 16 at the desired location 22, a representation of image 20 can be presented in overlay canvas 16. In some embodiments, the web page acting as the source for image 20 can be recalled by appropriately selecting the related element included in overlay canvas 16. It is appreciated that associated text from web browser user interface 14 can also be selected and copied to overlay canvas 16. Furthermore, elements included in overlay canvas 16 can be contextually linked to other elements. In some embodiments, additional content or context can be associated with an element included in overlay canvas 16. For example, upon copying an element to overlay canvas 16, data element 24 can be invoked, which can allow for entry of various data points associated with the underlying element. For example, data element 24 can operate as a prompt to add context to the element newly added to overlay canvas 16. Such context can include, for example, textual context, hashtags, title, voice data, and so on. In some embodiments, voice data can be recorded and/or played back by selecting or activating an appropriate element included in overlay canvas 16 such as example elements 30.

It is understood that overlay canvas 16 can provide numerous advantages. For example, constructing, assimilating, or linking ideas can be accomplished without interrupting or navigating away from the current line of research. For instance, a web page operating as a source of information need not be minimized, resized, or re-situated on a desktop UI in order to assimilate the information into one's ideas or research. Furthermore, unlike copying information to a desktop UI or other generic UI, a procedure that might still be disruptive to the creative process, employing overlay canvas 16 can allow for capturing and maintaining context in addition to the content. As one example, content included in overlay canvas 16 can be contextually linked to other content, as denoted by visual link 26. In addition to visual link 26, contextual relationships between elements can be annotated with text or other media or information, an example of which is provided by reference numeral 28. Such annotations can be populated manually or automatically populated and can be accessed based on a single click to an associated location of overlay canvas 16. In some embodiments, elements (e.g., images, videos, audio, text, contextual links, etc.) included in canvas overlay 16 can be freely moveable or sortable, either manually or automatically, which can further aid organization and so forth.

Turning back to FIG. 1B, the above example and other elements are described in more detail. Overlay canvas 104 can interface with or be included in or associated with browser UI 106 or browser application 108. When an instance of browser application 108 loads, then overlay canvas 104 can appear along with browser UI 106. If another instance of browser application 108 is loaded, then such can be associated with either the same overlay interface 104 or another instance of overlay canvas 104. For example, if the other instance of browser application 108 is executed in a new tab, then such can be associated with the same overlay canvas 104. If, however, the other instance of browser application 108 is executed as a new window (and/or not on the same tab), then such can be associated with a new overlay canvas 104.

Data component 112 can be configured to determine that an interface element 114 has been selected. In some embodiments data component 112 can determine that interface element 114 has been selected (e.g., selected for inclusion in overlay canvas 104) in response to selection input 116, which can be received from other components detailed herein. Regardless, in response to selection of interface element 114, data component can store to overlay data structure 118 content data 120 and context data 122. Content data 120 can relate to the data associated with interface element 114, non-limiting examples of which are provided with reference to FIG. 2. Context data 122 can relate to data associated with a context of content data 120, non-limiting examples of which are provided in connection with FIG. 3.

Figure 2:
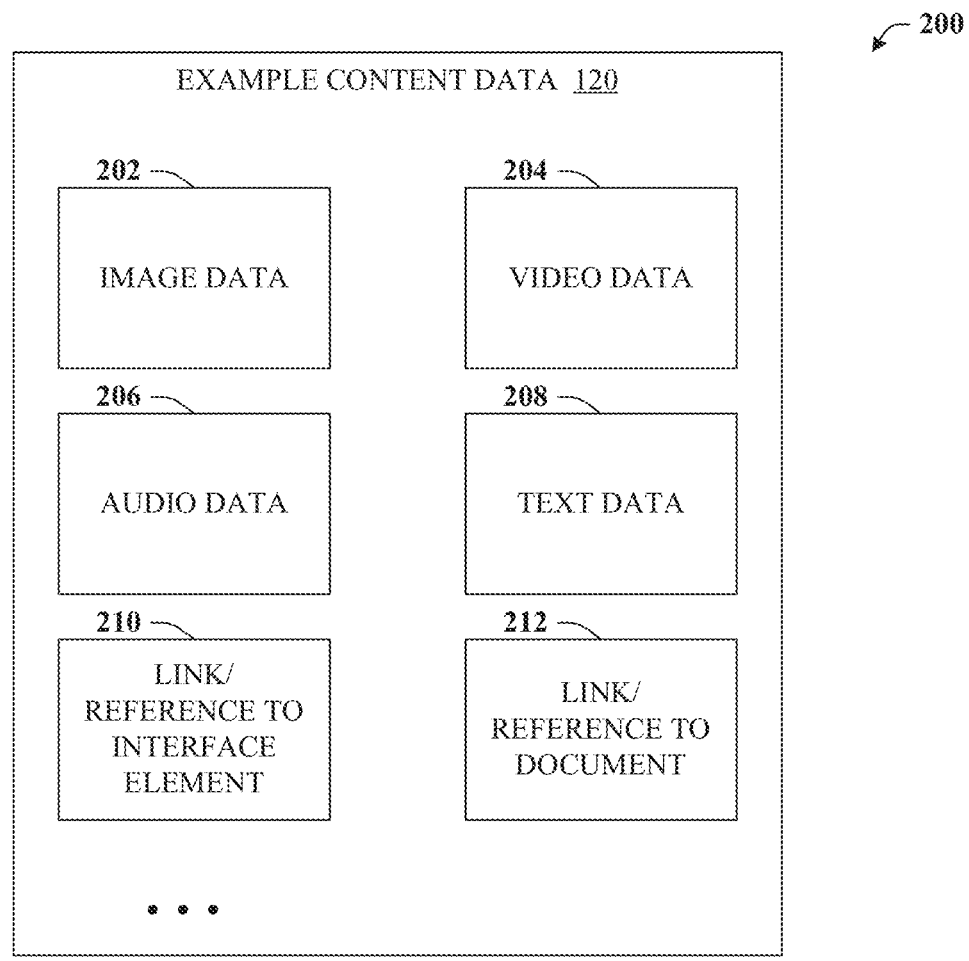
FIG. 2 illustrates a block diagram that depicts numerous examples of content data in accordance with certain embodiments of this disclosure.
Figure 3:
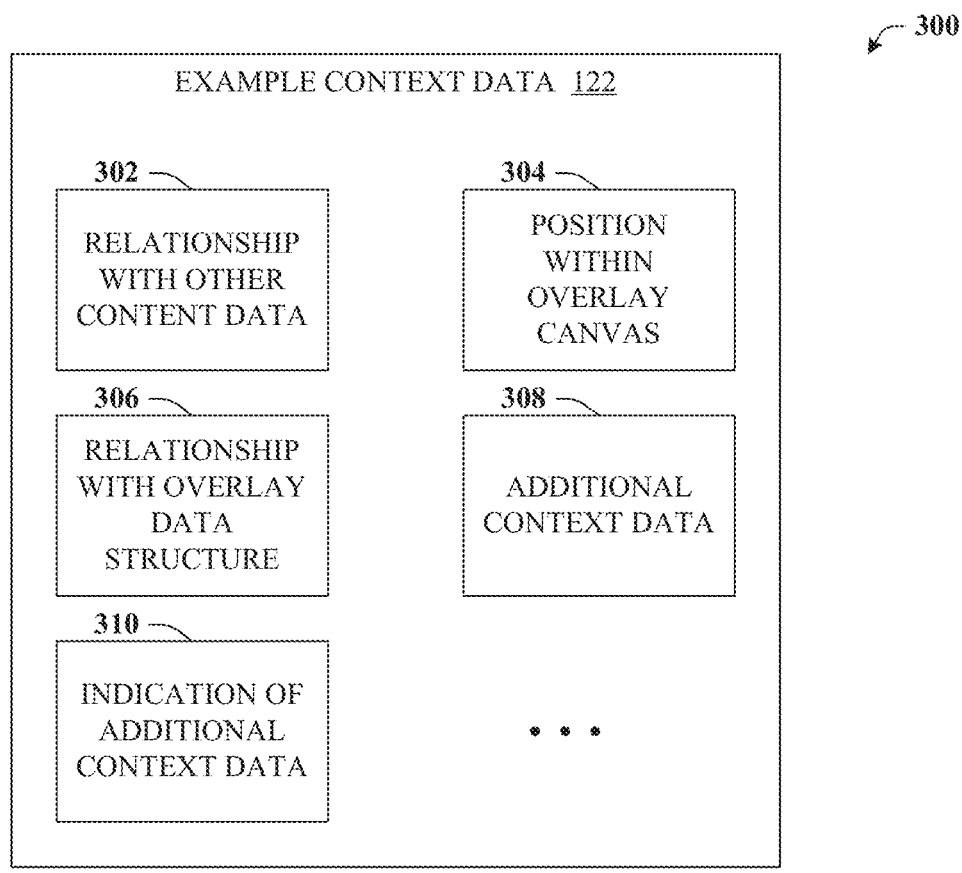
FIG. 3 illustrates a block diagram that depicts numerous examples of context data in accordance with certain embodiments of this disclosure.

While still referring to FIG. 1B, but referring also to FIGS. 2 and 3, illustrations 200 and 300 are provided. Illustration 200 depicts numerous examples of content data 120 and related data or information. For example, content data 120 can be image data 202, video data 204, audio data 206, text data 208, and so on. Content data 120 can also include data associated with various links or references. For instance, content data 120 can include link/reference 210 to interface element 114 (e.g., a URL associated with the image, video, audio, text, etc.) or link/reference 212 to a document (e.g., webpage, application document, etc.) that includes interface element 114.

Illustration 300 depicts numerous examples of context data 122. For instance, context data 122 can be relationship 302 with other content data (e.g., a relationship with other items or elements included in overlay canvas 104); position 304 within overlay canvas 104 (e.g., relative or absolute position); relationship 306 with overlay data structure 118 (e.g., an identification of the overlay data structure 118); additional context data 308 that can be manually input and further detailed herein; an indication 310 of the additional context data (e.g., a visual indicator denoting that an element in overlay canvas 104 includes manually input data).

Continuing the discussion of FIG. 1B, system 100 can also include rendering component 124. Rendering component 124 can be configured to facilitate rendering, in overlay canvas 104, overlay element 128. Overlay element 128 can represent interface element 114 (e.g., that was dragged and dropped or otherwise selected for inclusion in overlay canvas 104). Rendering component 128 can render overlay element 128 to include both content data 120 (e.g., an image) and context data 122 (e.g., a relationship with a different image or an annotation that additional context has been input).

For example, consider the scenario in which a user navigates browser UI 106 to a webpage that includes an image of a life jacket as depicted in FIG. 1C, and then drags that image (e.g., image 20) to overlay canvas 104. Rendering component 128 can render a new image (e.g., overlay element 128) that is representative of the original image (e.g., interface element 114) of the life jacket. It is understood that the new image might be smaller in scale, but can include all the original data (e.g., content data 120) and thus need not result in lossy data operations when the new image is expanded to the previous scale (or even beyond). The rendering of the new image in overlay canvas 104 can also include various relationships or other context (e.g., context data 122).

When the original image is dragged to overlay canvas 104, a popup box or another mechanism (e.g., reference numeral 24 of FIG. 1C) can be employed to enable input of additional context information (e.g., notes, descriptions, ideas, relationships etc.). The popup box can be dismissed by clicking elsewhere or by another means, and any data input, either manually or automatically populated, can be saved to overlay data structure 118.

Figure 4A:
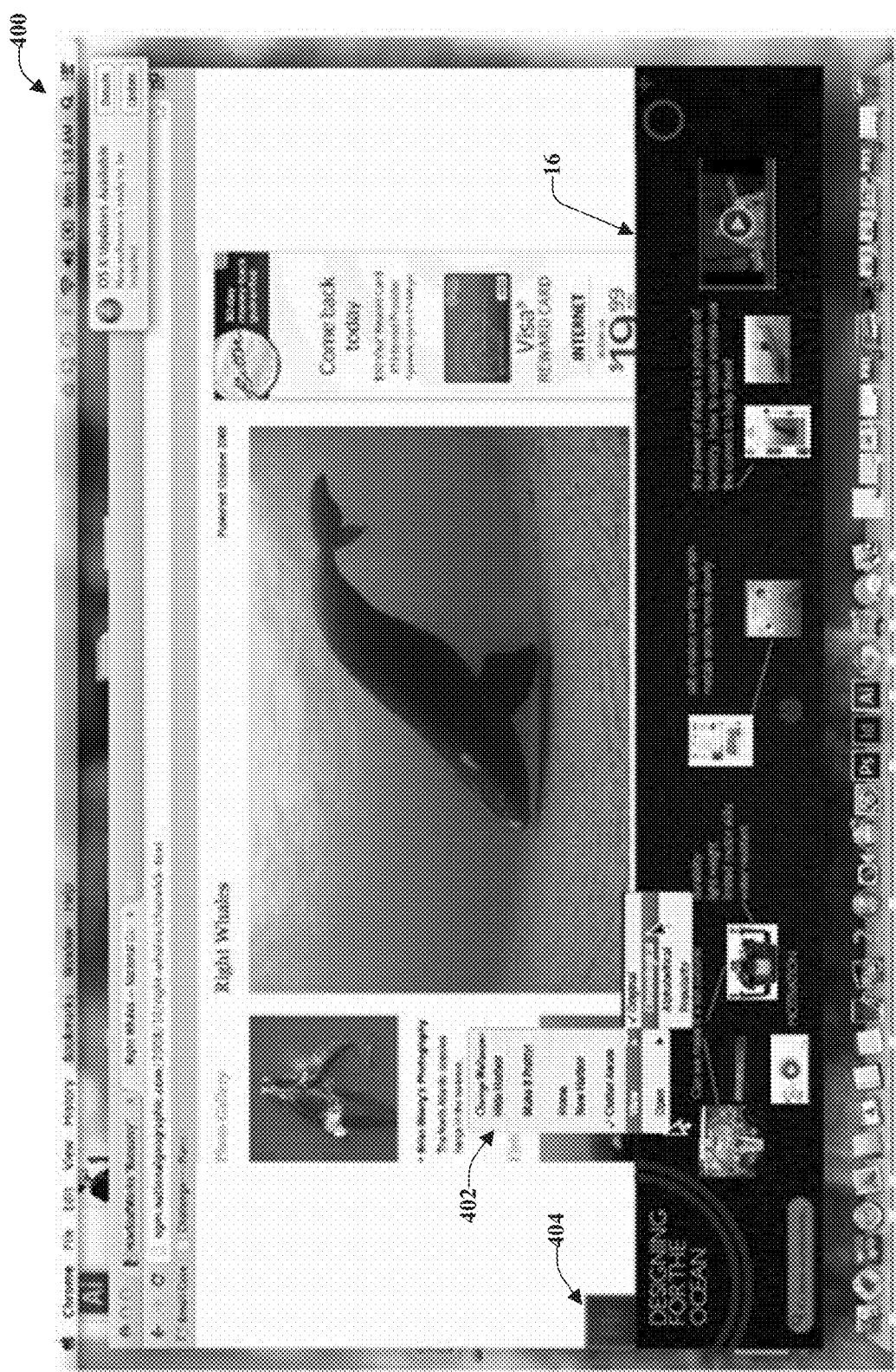
Figure 4B:
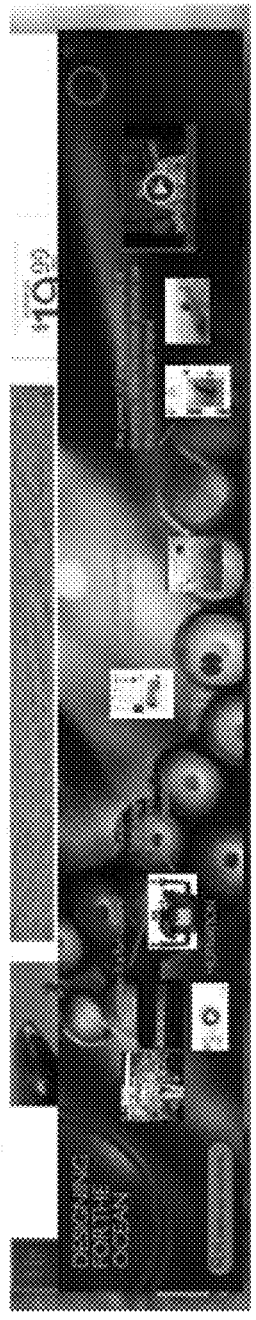

Turning now to FIG. 4A, graphical illustration 400 is depicted. Graphical illustration 400 depicts an embodiment that can provide for various additional menu-based elements, examples of which can be found with reference to FIGS. 4B-4E. For example, right-clicking or otherwise appropriately selecting overlay canvas 16 can invoke menu 402 or another selection element. Menu 402 can include numerous functions or aspects associated with the disclosed subject matter, some examples of which are detailed herein. For instance, menu 402 can include an option to "change wallpaper" or otherwise modify a background associated with overlay canvas 16. An example of such is provided by FIG. 4B, in which the background for overlay canvas 16 has been modified from a plain black background to the illustrated background.

Figure 4C:
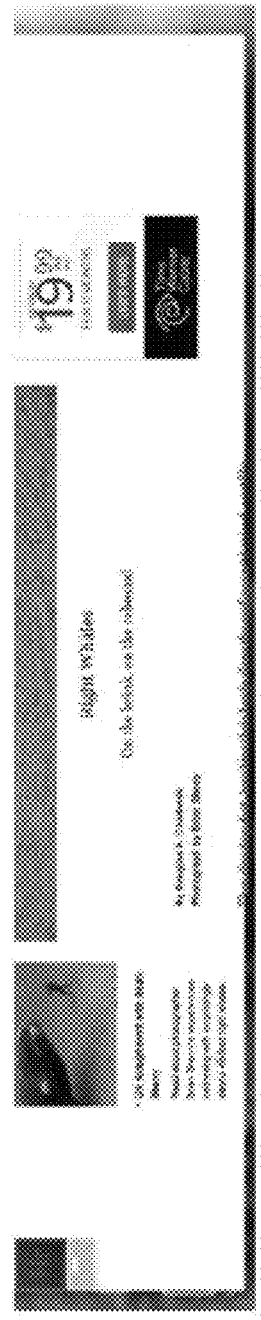

Menu 402 can also include a selection to "hide harbor" and/or minimize or remove from view overlay canvas 16, an example of which can be found with reference to FIG. 4C. Appreciably, upon hiding overlay canvas 16, previously occluded areas of web browser user interface 14 can be presented in an un-occluded manner. In addition, in cases where overlay canvas 16 is in a minimized or hidden state, menu 402 can include an option to "show harbor" (e.g., unhide and/or reveal overlay canvas 16). In some embodiments, hiding/un-hiding overlay canvas 16 can be accomplished by selecting a suitable element or button, such as element 404.

Figure 4D:
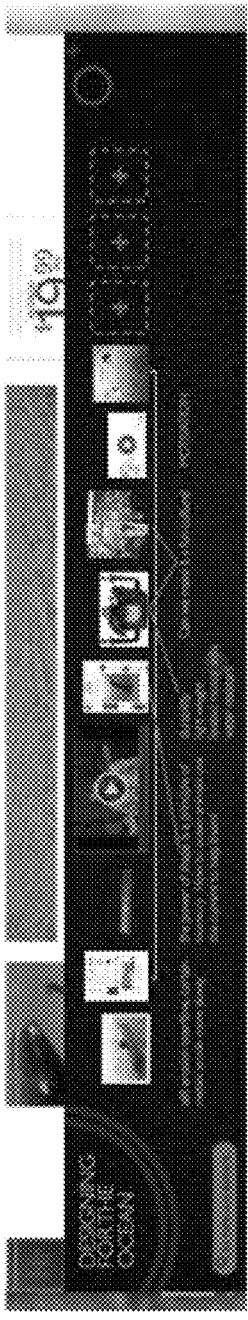

Menu 402 can further include an option relating to viewing or sorting elements included in overlay canvas 16. For example, elements added to overlay canvas 16 can be organized according to an original topology (e.g., elements situated at locations where the user placed them) or sorted according to a selected parameter, such as chronologically (e.g., time at which an element was added to overlay canvas 16), reverse chronologically, randomized, alphabetically and/or based on alphanumeric sorting, popularity and so on. FIG. 4D illustrates an example in which overlay canvas 16 has been sorted chronologically. It is appreciated that upon sorting or otherwise modifying the organization of elements included in overlay canvas 16, contextual information such as relationship links can be maintained.

Figure 4E:
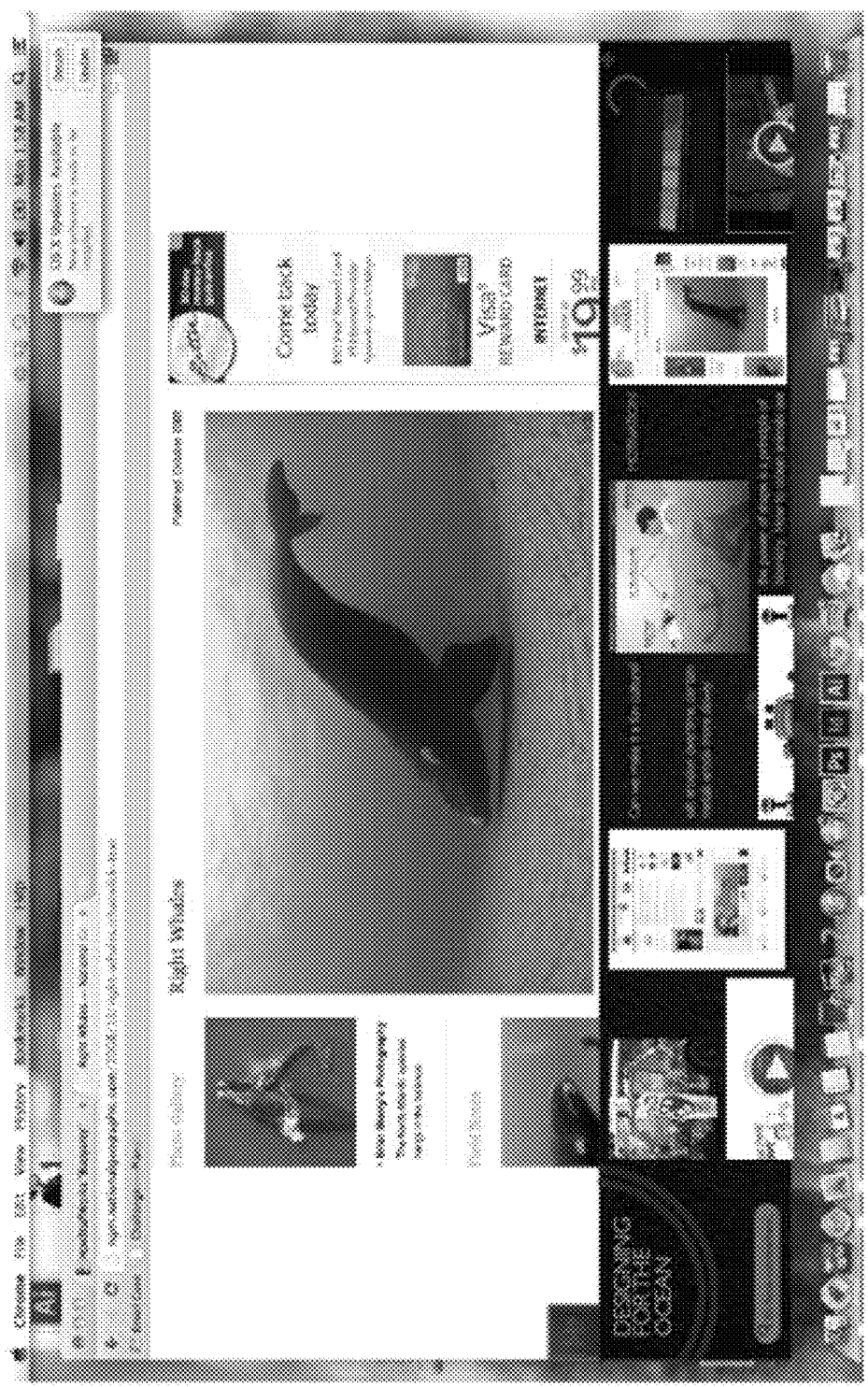
Figure 5:
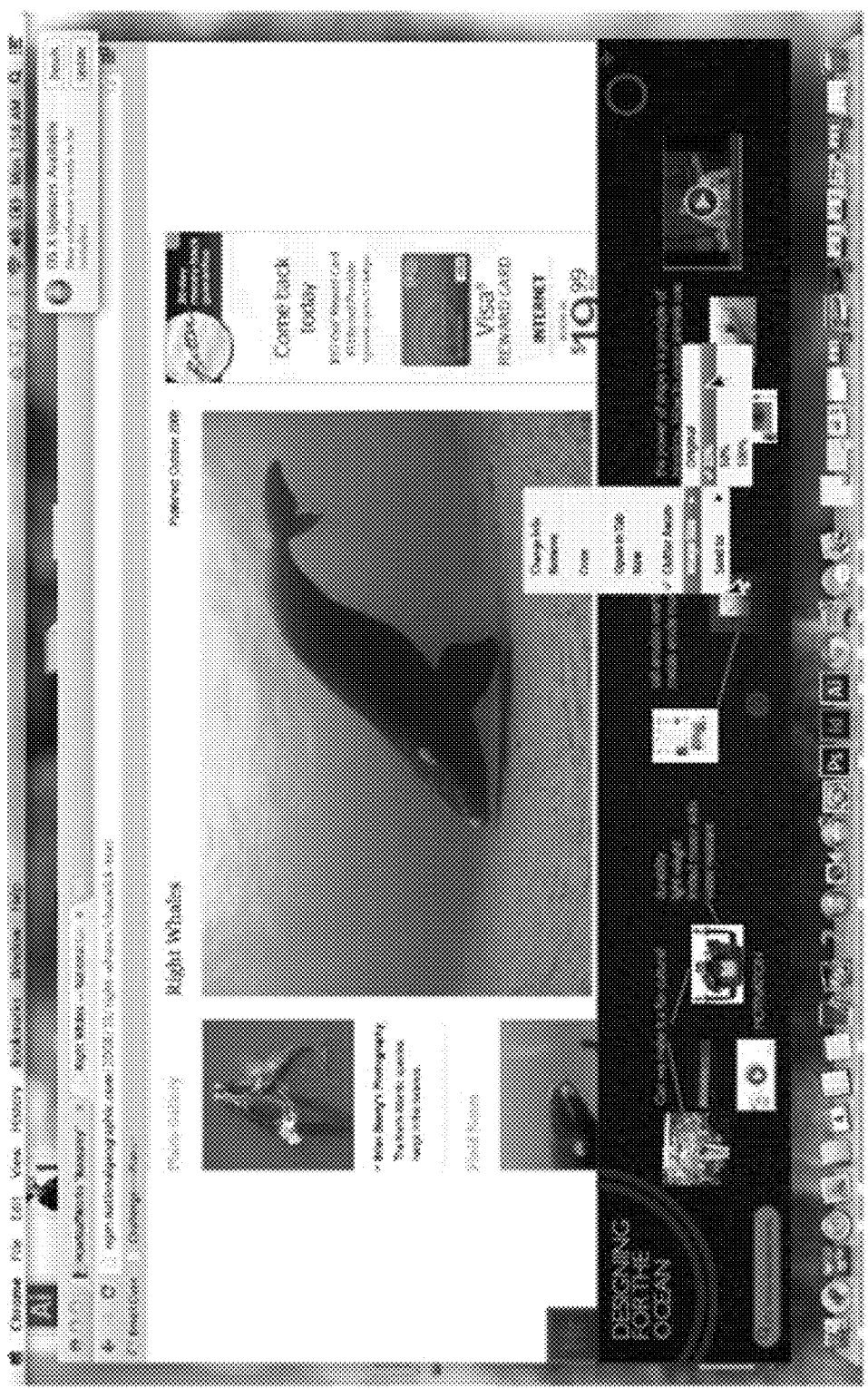

Menu 402 can also include an option to "make it pretty," an example of which is provided at FIG. 4E. Selecting this option can organize elements in overlay canvas 16 according to an aesthetically pleasing grid pattern that, if necessary, can be navigated via scroll bars. Moreover, menu 402 can include a "clutter aware" selection. Such can operate in a persistent manner (e.g., always on/off) such that activation need not require active selection but rather can be based on another parameter such as a state associated with overlay canvas 16. In this case, the "clutter aware" option can automatically shrink elements included in overlay canvas 16 based on a condition associated with overlay canvas 16. For instance, when overlay canvas 16 is spatially full of many elements (or 75% full, etc.), then one or more elements included in overlay canvas 16 can be automatically reduced in size. Such can free up additional workspace without requiring the user to interrupt his or her work to manually perform a similar task. In some embodiments, one or more elements included in overlay canvas 16 can be selected and resized relative to other elements or to overlay canvas 16, which can enable advantageous aspects relating to hierarchy and improved organization. An example of such is depicted in connection with FIG. 5. It is understood that elements detailed in connection with menu 402 can also be activated or invoked based on other interactions with overlay canvas 16 and therefore need not be limited to selection via menu 402.

In some embodiments, system 100 can include elements for detecting a hovering cursor or other selection element. For example, a cursor that hovers over an element included in the overlay canvas (e.g., overlay canvas 16 and/or 104) can prompt additional information associated with that element, as exemplified by FIG. 6. In this example, the mouse cursor hovers over one of the elements for a predetermined time. In response, a popup is generated that provides the additional information. In this case, a larger-scale image is displayed along with data element 24 detailed in connection with FIG. 1C. As noted, data element 24 can include various contextual data associated with the element. Thus, both content (e.g., the larger-scale image) and context (e.g., data element 24) can be quickly accessed.

Figure 7:
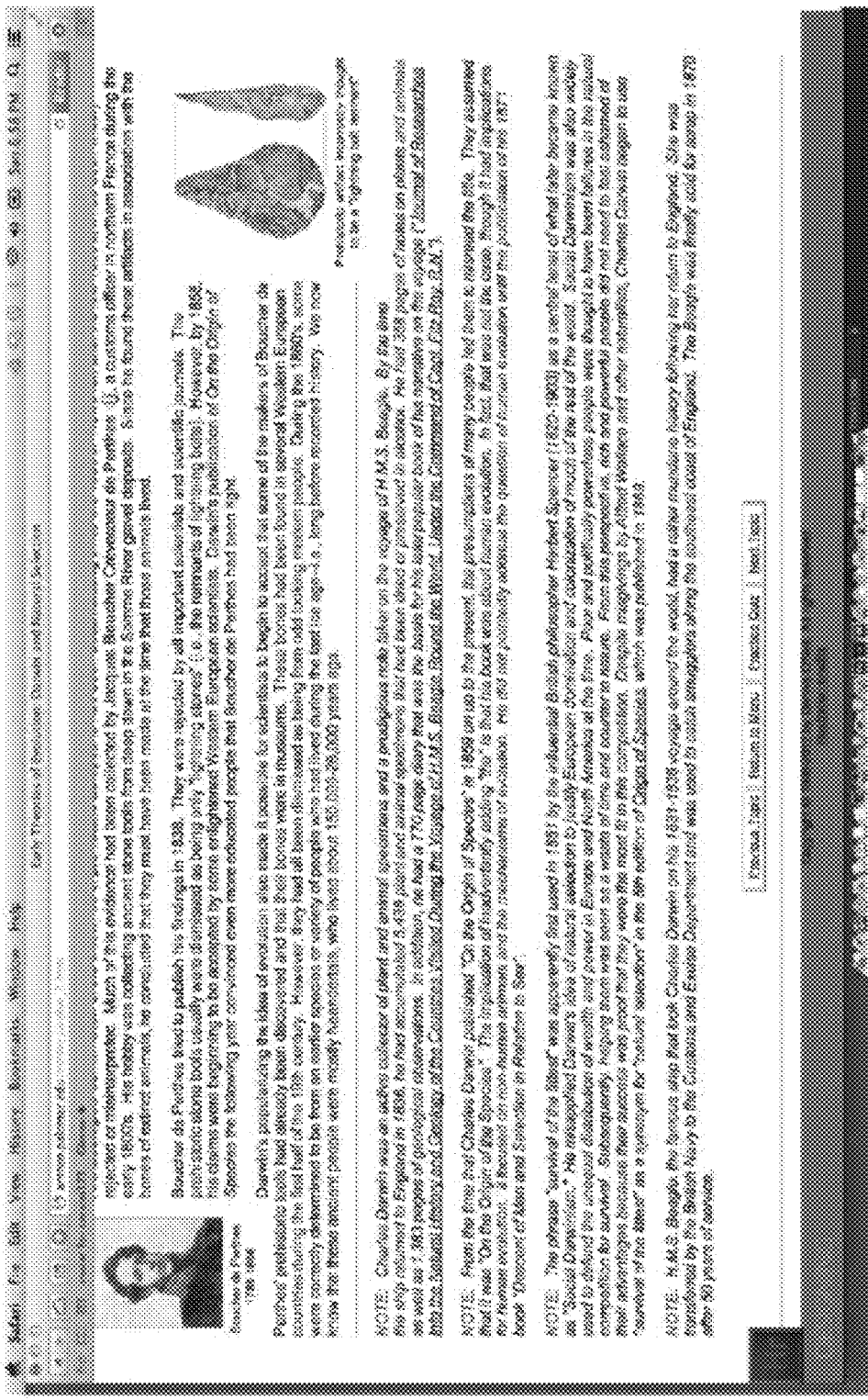

In some embodiments, system 100 can include elements for detecting and/or modifying the end of a web page. For example, consider the case in which a web page includes information that is occluded by the overlay canvas. As the user scrolls through the web page and reaches the bottom, such can be detected. In response, system 100 can cause the overlay canvas to auto-hide and/or minimize. Such can reveal the occluded portions of the web page, and an example of such is provided with reference to FIG. 7. Additionally or alternatively, system 100 can insert hypertext line breaks at the bottom of the web page and/or after the content of the web page. The number of line breaks can be calculated to match a size associated with the overlay canvas. Thus, upon scrolling to the bottom of a web page, no actual content is occluded by the overlay canvas. Rather, only a blank space (potentially matched to the size of the overlay canvas) is occluded by the overlay canvas.

Figure 9:
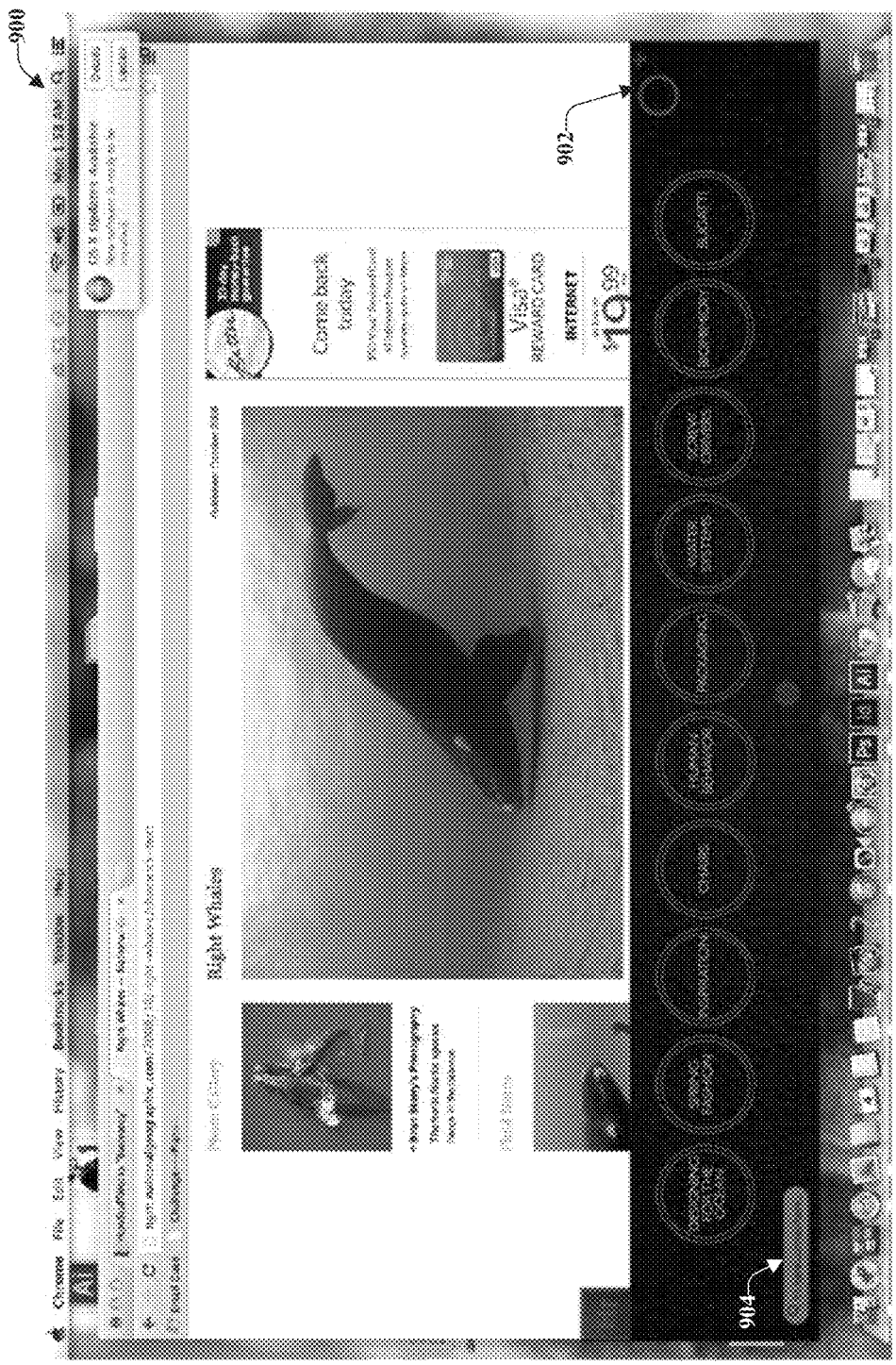

Turning now to FIG. 9, graphical illustration 900 is depicted. Graphical illustration 900 depicts an embodiment that can provide for various additional features or aspects. It is noted that many of the previous include an overlay canvas entitled "Designing for the Ocean." The content and context of data stored in that overlay canvas (as well as others) can be saved for later access or recall. Thus, a "home" canvas can be provided, which can provide for navigation of previously saved work. This home canvas can be visited upon initial invocation of a web browser and/or the overlay canvas, or might be visited based on selection input (e.g., selecting a suitable object such as objects 902). Furthermore, creating a new harbor and/or overlay canvas can operate in a substantially similar manner.

In some embodiments, a search element 904 can be provided. Information entered into search element 904 can be matched to harbor titles (e.g., the title supplied for a given overlay canvas) as well as individual elements included in the various harbors. Results to the search can be displayed in the current space allocated for the overlay canvas.

Figure 10:
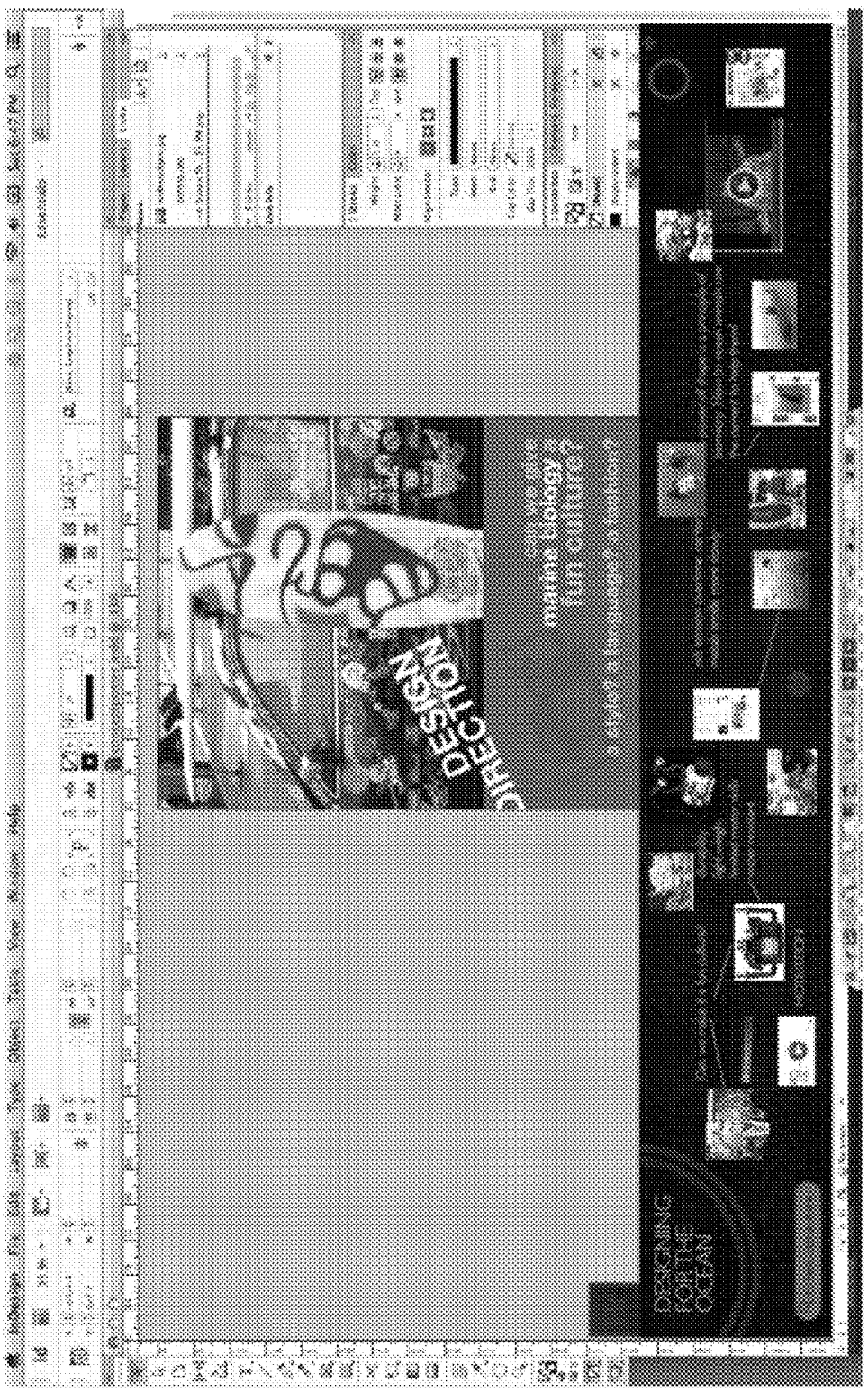

In some embodiments, data included in a particular harbor and/or overlay canvas can be transported to other applications, such as presentation-based software. Thus, data included in an overlay canvas can be configured to be compatible with other presentation-based application. For instance, FIG. 10 provides an example of loading an example harbor in connection with utilizing Adobe-brand software to generate a presentation based on information stored in the harbor. In some embodiments, elements in the harbor can be dragged and dropped into the design area of the Adobe-brand user interface.

Example Methods for Providing an Overlay Canvas

Figure 11:
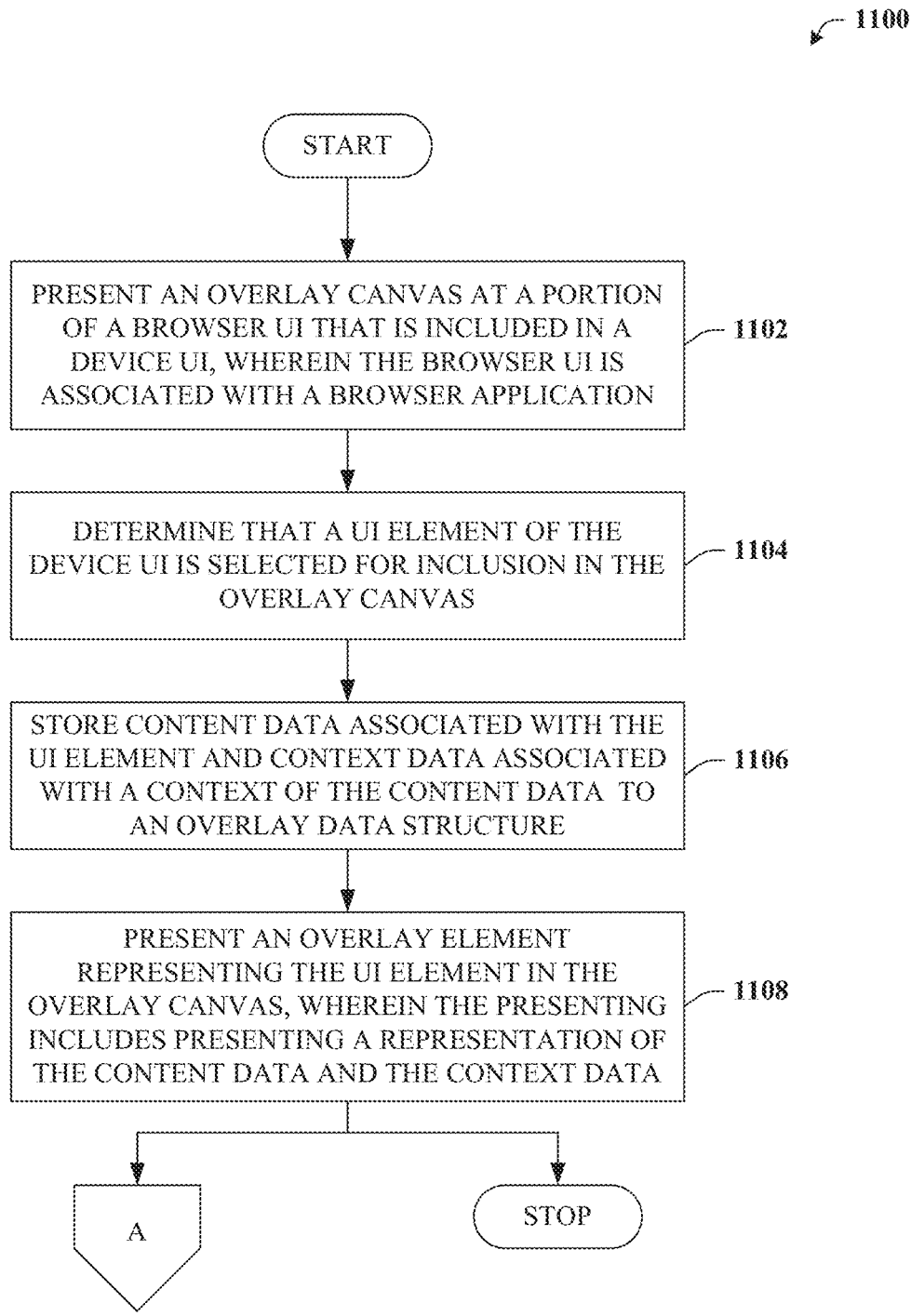
FIG. 11 illustrates an example methodology that can provide for presenting an overlay canvas in accordance with certain embodiments of this disclosure.
Figure 12:
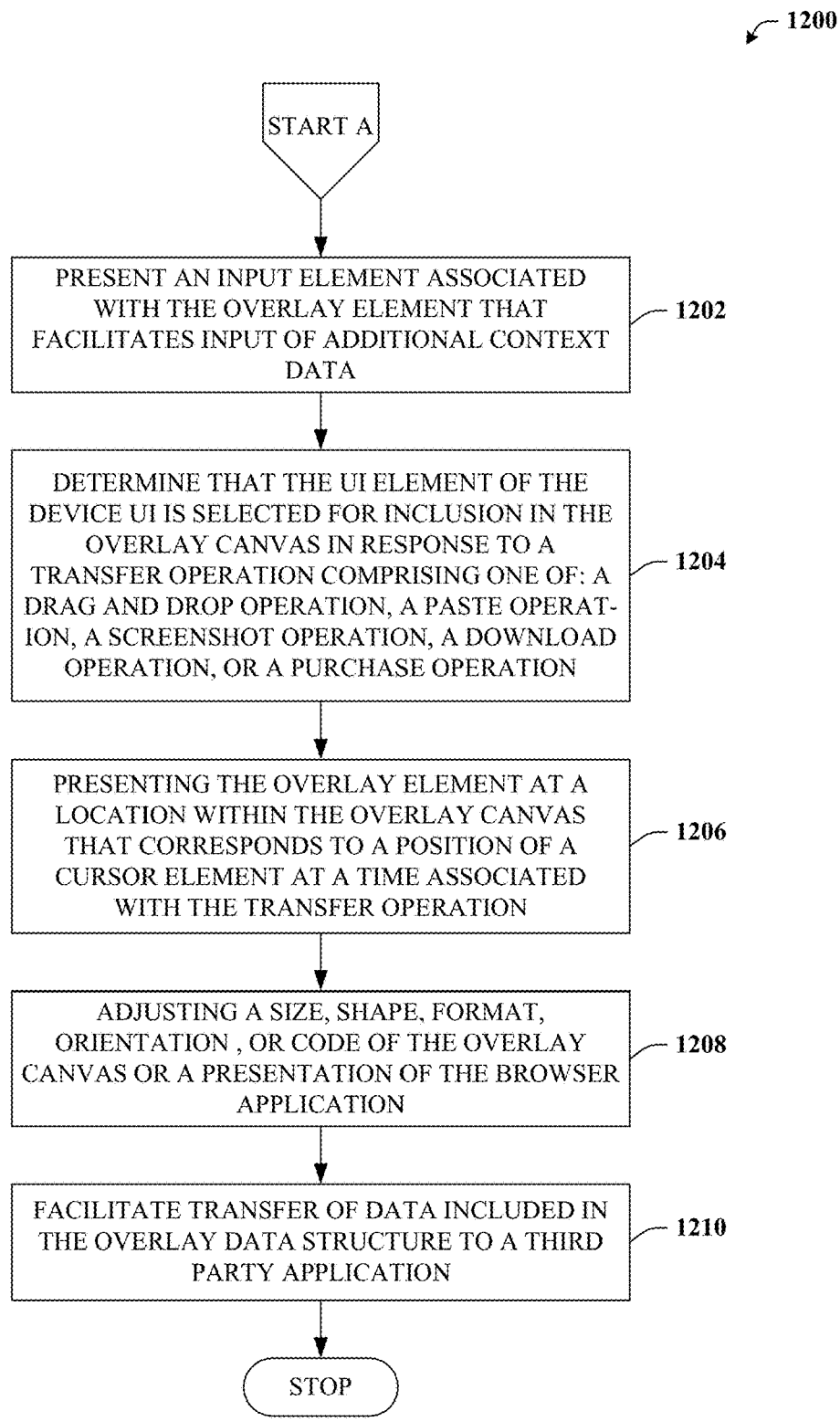
FIG. 12 illustrates an example methodology that can provide for additional features or aspects in connection with presenting the overlay canvas in accordance with certain embodiments of this disclosure.

FIGS. 11 and 12 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 11 illustrates exemplary method 1100. Method 1100 can provide an overlay canvas that can retain both content and context of selected data. For example, at reference numeral 1102, an overlay canvas can be presented at a portion of a browser UI that is included in a device UI. The browser UI can be associated with a browser application that executes on a device that provides the device UI. The overlay canvas can overlay a portion of the browser UI, or can appear elsewhere if the browser UI is minimized or occluded (e.g., a toolbar, etc.).

At reference numeral 1104, it can be determined that a UI element of the device UI (which can include the browser UI) is selected for inclusion in the overlay canvas. Such can be based on various selection operations such as a drag-and-drop operation, a copy-and-paste operation, and so on. At reference numeral 1106, content data (e.g., media file data, address/location data, etc.) associated with the UI element and context data (e.g., relationships, purpose, category, etc.) associated with a context of the content data can be stored to an overlay data structure.

At reference numeral 1108, an overlay element representing the UI element can be presented in the overlay canvas. Presenting the overlay element in the overlay canvas can include presenting visual indicia representing the content data and the context data. Method 1100 can proceed to insert A detailed in connection with FIG. 5 or terminate.

Turning now to FIG. 12, exemplary method 1200 is depicted. Method 1200 can provide for additional features or aspects in connection with providing an overlay canvas to store content and context for selected data. Method 1200 can begin at the start of insert A. At reference numeral 1202, an input element associated with the overlay element can be presented. For example, the input element can be presented in response to the creation of a new overlay element (e.g., when a UI element is dragged to the overlay canvas) detailed in connection with reference numeral 1108 of FIG. 11. The input element can facilitate input of additional context data that can be automatically populated for some fields and/or manually input for other fields.

At reference numeral 1204, additional determinations can be made in connection with the determination detailed at reference numeral 1104 of FIG. 11 that a UI element of the device UI is selected for inclusion in the overlay canvas. For instance, such a determination can be made in response to a transfer operation comprising one of: a drag and drop operation, a paste operation, a copy operation, a screenshot operation, a download operation, a purchase operation or the like.

At reference numeral 1206, the overlay element can be presented at a location within the overlay canvas that corresponds to a position of a cursor element (e.g., mouse cursor, etc.) at a time associated with the transfer operation. Otherwise, e.g., if no cursor data is suitable, the location can be determined based on a defined and/or selected arrangement setting or preference.

At reference numeral 1208, a size, shape, format, orientation, or code of the overlay canvas or a presentation of the browser application can be adjusted. Such can be employed in connection with many features detailed herein, but as an example, consider the case where the overlay canvas overlays the bottom 30% of the browser UI. As a result, this bottom portion of the browser UI might be occluded. Such data can normally become visible by scrolling with a scroll bar, but generally only until scrolling to the bottom of the page. To enable ready access to information included in the bottom portion of the browser UI, after maximal scrolling, the disclosed subject matter can detect that additional information is occluded by the overlay canvas and respond in various ways. As one example, by automatically minimizing, resizing, or relocating the overlay canvas to enable presentation of otherwise occluded content of the browser UI. As another example, code associated with the browser UI (e.g., hypertext markup language (HTML) code) that the browser application employs to present the webpage can be modified to include additional line breaks (e.g., <BR>) at the bottom of the webpage. Accordingly, it can be ensured that enough line breaks exist to enable all content on the webpage to be viewable by way of scrolling, even with the overlay canvas. At reference numeral 1210, data included in the overlay data structure can be transferred to a third party application.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 13:
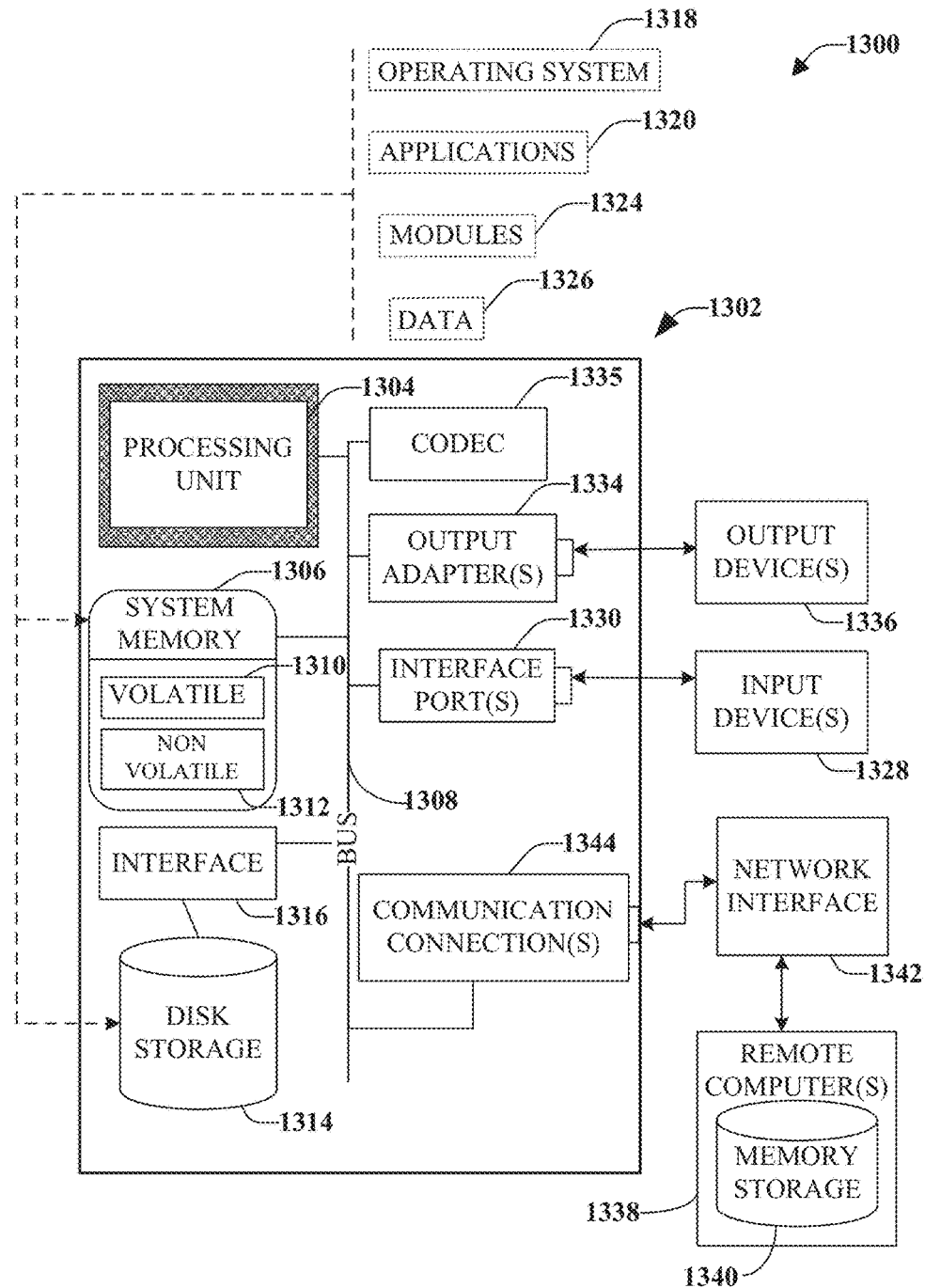
FIG. 13 illustrates an example schematic block diagram for a computing environment in accordance with certain embodiments of this disclosure.

With reference to FIG. 13, a suitable environment 1300 for implementing various aspects of the claimed subject matter includes a computer 1302. The computer 1302 includes a processing unit 1304, a system memory 1306, a codec 1335, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1335 may include at least one of an encoder or decoder, wherein the at least one of an encoder or decoder may consist of hardware, software, or a combination of hardware and software. Although, codec 1335 is depicted as a separate component, codec 1335 may be contained within non-volatile memory 1312 or included in other components detailed herein. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 6) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Figure 6:
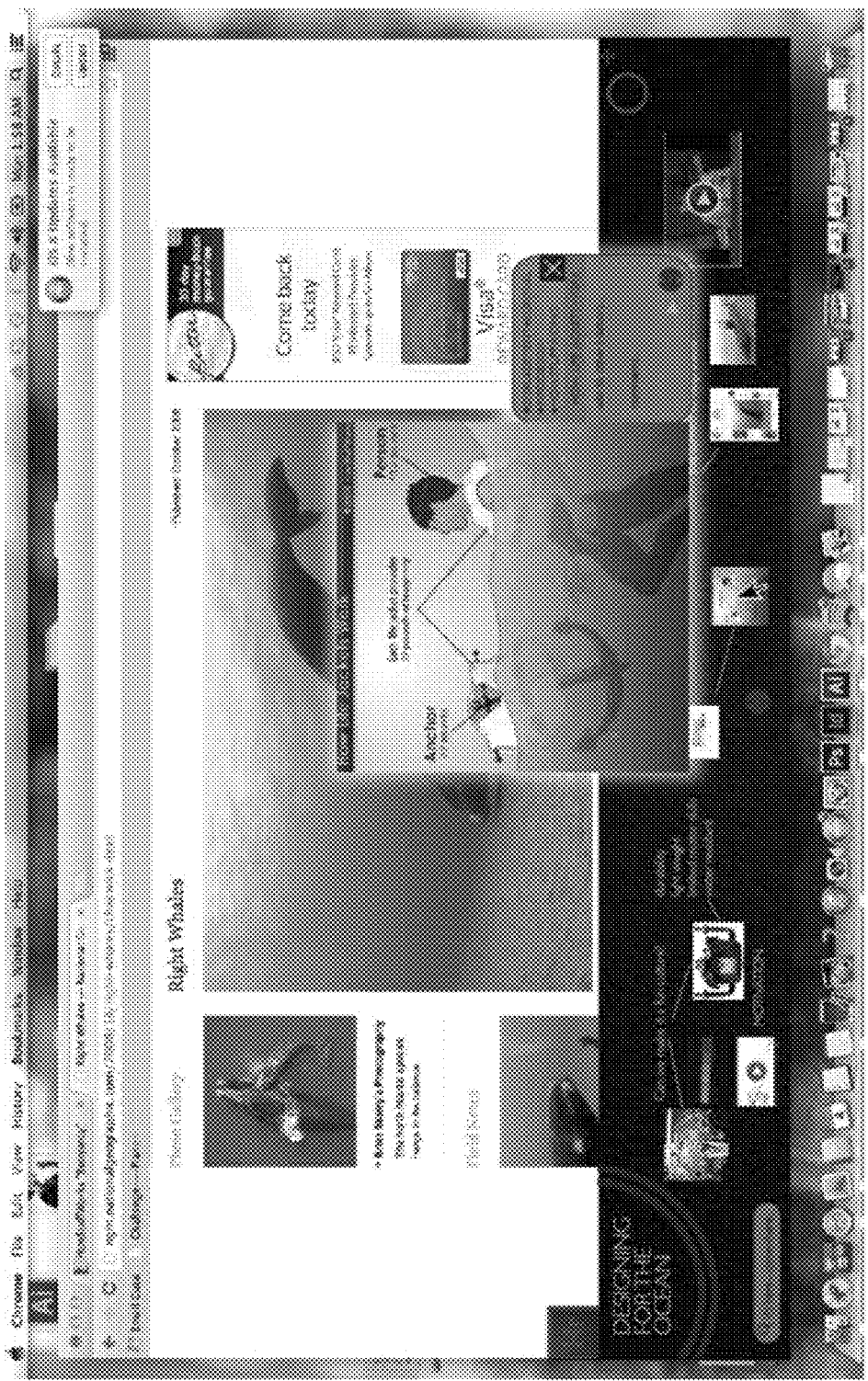

Computer 1302 may also include removable/non-removable, volatile/non-volatile computer storage medium. FIG. 6 illustrates, for example, disk storage 1314. Disk storage 1314 includes, but is not limited to, devices like a magnetic disk drive, solid state disk (SSD) floppy disk drive, tape drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316. It is appreciated that storage devices 1314 can store information related to a user. Such information might be stored at or provided to a server or to an application running on a user device. In one embodiment, the user can be notified (e.g., by way of output device(s) 1336) of the types of information that are stored to disk storage 1314 and/or transmitted to the server or application. The user can be provided the opportunity to opt-in or opt-out of having such information collected and/or shared with the server or application (e.g., by way of input from input device(s) 1328).

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302 and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
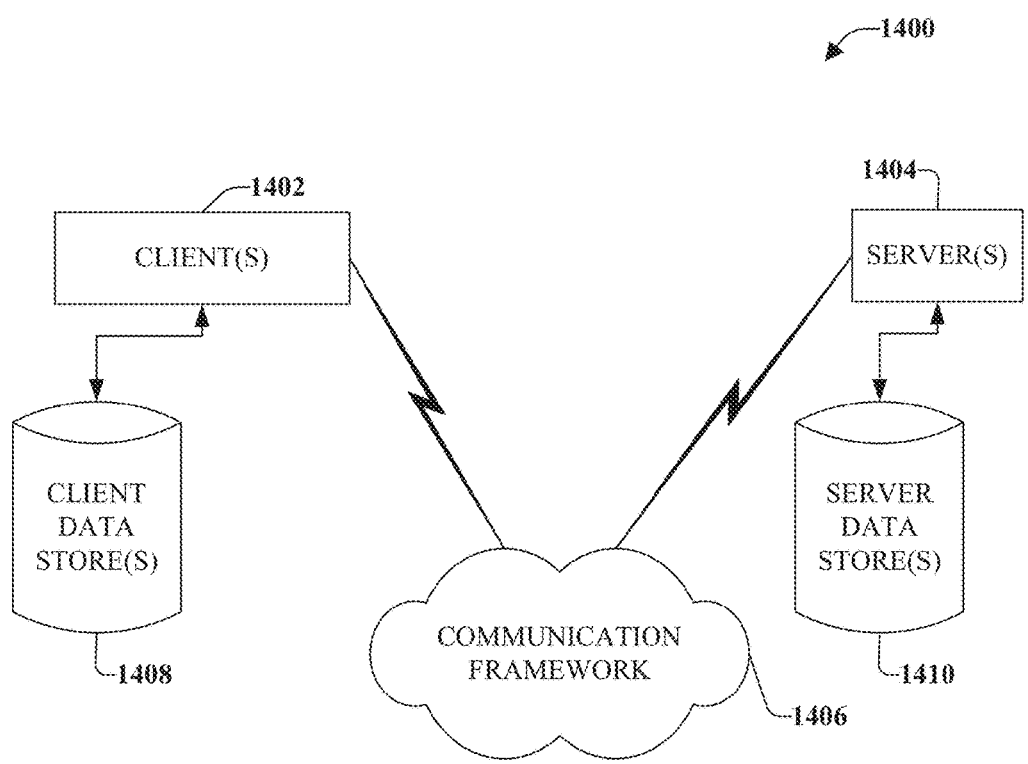
FIG. 14 illustrates an example block diagram of a computer operable to execute certain embodiments of this disclosure.

Referring now to FIG. 14, there is illustrated a schematic block diagram of a computing environment 1400 in accordance with this specification. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a cookie and/or associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/ circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
 a memory that stores computer executable components; and
 a processor that executes the following computer executable components stored in the memory:
  a presentation component that:
   presents a view of an overlay canvas that overlays a portion of a first browser user interface (UI) associated with a first instance of a web browser application that presents the first browser UI on a device UI, and associates the overlay canvas with the first instance of the web browser application, and
   based on determination that a second browser UI associated with a second instance of the web browser application is being concurrently presented on the device UI with the first browser UI, also associates the overlay canvas with the second instance of the web browser application;
  a data component that:
   in response to selection of a first interface element presented by the first browser UI, stores to an overlay data structure content data associated with the first interface element and first context data associated with a first context of the first content data; and
   in response to selection of a second interface element presented by the second browser UI, stores to the overlay data structure content data associated with the second interface element and second context data associated with a second context of the second content data;
  a rendering component that:

renders in the overlay canvas at least one of a first overlay element that represents the first interface element or a second overlay element that represents the second interface element, wherein the rendering of the first overlay element includes a representation of the first content data and the first context data, and the rendering of the second overlay element includes a representation of the second content data and the second context data; and renders a context relationship between the first overlay element or the second overlay element other content data in the overlay canvas, wherein the context relationship is a visual link with textual information that is automatically populated when a new overlay elements is selected; and a configuration component that reorganizes elements, comprising at least the first overlay element or the second overlay element, presented in the overlay canvas according to a popularity metric, wherein the data component stores, to the overlay data structure, the overlay canvas updated with the context relationship, wherein the presentation component presents, in the overlay canvas, a view of a menu comprising multiple overlay contexts comprising a search element and a stored overlay canvas, stored by the data component, and wherein the rendering component:
  renders the stored overlay canvas of a selected overlay context in response to selection of one of the multiple overlay contexts; and
  renders a UI search element to search stored overlay data structures in response to selection of the search element.

2. The system of claim 1, wherein the rendering component, in response to rendering the first overlay element or the second overlay element in the overlay canvas, facilitates rendering a data input element that is associated with the first overlay element or the second overlay and facilitates input of additional context data to the first overlay element or the second overlay element.

3. The system of claim 1, wherein the presentation component presents the overlay canvas during a browsing session.

4. The system of claim 1, wherein the selection of the first interface element is invoked based on a drag and drop operation characterized by selecting and dragging the first interface element to the overlay canvas and dropping the first interface element in the overlay canvas.

5. The system of claim 4, wherein the rendering component identifies a position within the overlay canvas at which the first interface element was dropped, and renders the first overlay element at the position.

6. The system of claim 1, wherein the configuration component reorganizes the elements in response to a determination that the overlay canvas is in a cluttered state characterized by the elements exceeding a defined threshold of available space allocated to the overlay canvas.

7. The system of claim 1, wherein the configuration component reorganizes the elements in groups based on the context relationship.

8. The system of claim 1, wherein the selection of the first interface element is invoked based on at least one of:
  a paste operation characterized by copying or cutting the first interface element and pasting the first interface element to the overlay canvas;
  a screenshot operation characterized by copying contents of a portion of the device UI; and
  a download or purchase operation characterized by downloading content via a communications network.

9. The system of claim 1, wherein the first content data includes data associated with at least one of an image, a video, an audio, text, a link or reference to the first interface element, or a link or reference to a document that includes the first interface element.

10. The system of claim 9, wherein the first context data includes data associated with at least one of a position within the overlay canvas, a relationship to the overlay data structure, or an indication that the first overlay element includes additional context data.

11. The system of claim 1, wherein the presentation component presents another canvas overlay in response to instantiation of a third web browser application instance having a third browser UI presented on the device UI.

12. The system of claim 1, wherein the presentation component, based on a determination that the overlay canvas occludes a bottom portion of the first browser UI, adds a quantity of line breaks after content of a web page displayed in the first browser UI that allows a bottom end portion of the content to be displayed in a non-occluded portion of the first browser UI in response to scrolling.

13. The system of claim 1, wherein the canvas overlay includes at least one of: a feature to search for or view another overlay data structure, a feature to load another overlay data structure or to load the overlay data structure on another device, a feature to change the dimensions of the overlay canvas, a feature to name or identify the overlay canvas or the overlay data structure, a feature to record or play audio input or annotation stored by the data component, a feature to record text input or annotation stored by the data component, a feature convert audio data to text data, a feature to add additional context, a feature to record graphical input or annotation stored by the data component, a feature to close the overlay canvas, a feature to reposition elements included in the overlay canvas, a feature to resize elements included in the overlay canvas, a feature to edit elements included in the overlay canvas, a feature to enabling scrolling of the overlay canvas, a feature to detect cursor hover, a feature to provide a different view of or additional options for an element included in the overlay canvas in response to the detect cursor hover, a feature to copy, export, or share one or more overlay data structures, or a feature to organize elements included in the overlay canvas according to alphanumeric order, chronologically, or another metric.

14. The system of claim 1, wherein the rendering component, in response to a presentation of the first overlay elements renders a prompt for an audio recording representing additional context data.

15. The system of claim 1, further comprising a viewing component that facilitates adjusting a size, shape, format, orientation of, or code for, the overlay canvas in response to a determination that browser content occluded by the overlay canvas is targeted for presentation.

16. The system of claim 1, wherein the presentation component further arranges overlay elements included in one or more overlay canvases in a document.

17. The system of claim 1, wherein the overlay data structure is stored in a cloud-based server that is accessible via a network device.

18. The system of claim 17, wherein access to the cloud-based server is based on a user account subscription.

19. The system of claim 1, wherein the presentation component further interfaces with a third party application, different than the web browser application and facilitates transfer of data included in the overlay data structure to the third party application.

20. The system of claim 1, wherein the presentation component further determines analysis data based on an analysis of transactions input to the system and the rendering component renders one or more overlay elements in the overlay data structure.

21. The system of claim 20, wherein the presentation component facilitates presentation of statistical feedback based on the analysis data.

22. The system of claim 20, wherein the presentation component facilitates modification to the overlay canvas based on an optimization determined from behavioral data included in the analysis data.

23. A method, comprising:
presenting, by a system including a processor, a view of an overlay canvas at a portion of a first browser user interface (UI) that is included in a device UI, wherein the first browser UI is associated with a first instance of a browser application;
based on determination that a second browser UI associated with a second instance of the browser application is being concurrently presented on the device UI with the first browser UI, also associating, by the system, the overlay canvas with the second instance of the browser application;
in response to determining that a first UI element of the first browser UI is selected for inclusion in the overlay canvas, storing, by the system, first content data associated with the first UI element and first context data associated with a first context of the first content data to an overlay data structure;
in response to determining that a second UI element of the second browser UI is selected for inclusion in the overlay canvas, storing, by the system, second content data associated with the second UI element and second context data associated with a second context of the second content data to the overlay data structure;
presenting, by the system, element data comprising at least one of a first overlay element representing the first UI element or a second overlay element representing the second interface element in the overlay canvas, wherein the presenting the element data includes presenting a representation of the first content data and the first context data, or a representation of the second content data and the second context data;
presenting, by the system, a context relationship between a member of the element data and other content data in the overlay canvas, wherein the context relationship is a visual link with textual information that is automatically populated when a new overlay elements is selected;
reorganizing elements presented in the overlay canvas according to a popularity metric;
updating the overlay canvas stored in the overlay data structure with the context relationship;
presenting, in the overlay canvas, a view of a menu comprising multiple overlay contexts comprising a search element and a stored overlay canvas that was previously stored; and
in response to selection of one of the multiple overlay contexts, presenting the stored overlay canvas of a selected overlay context; and in response to selection of the search element, presenting a UI search element to search stored overlay data structures.

24. The method of claim 23, further comprising presenting, by the system, an input element associated with the first overlay element that facilitates input of additional context data.

25. The method of claim 23, wherein the determining that the first UI element of the first browser UI is selected for inclusion in the overlay canvas is in response to a transfer operation comprising one of: a drag and drop operation, a paste operation, a screenshot operation, a download operation, or a purchase operation.

26. The method of claim 25, wherein the presenting the first overlay element comprises presenting the first overlay element at a location within the overlay canvas that corresponds to a position of a cursor element at a time associated with the transfer operation.

27. The method of claim 23, further comprising facilitating adjusting, by the system, a size, shape, format, orientation of, or code for, the overlay canvas or a presentation of the browser application.

28. The method of claim 23, further comprising facilitating, by the system, transfer of data included in the overlay data structure to a third party application.

29. A non-transitory computer readable storage medium storing computer-executable instructions that, in response to execution, cause a device including a processor to perform operations, comprising:
presenting a view of an overlay canvas at a portion of a first browser user interface (UI) that is included in a device UI, wherein the first browser UI is associated with a first instance of a browser application;
based on determination that a second browser UI associated with a second instance of the browser application is being concurrently presented on the device UI with the first browser UI, also associating the overlay canvas with the second instance of the browser application;
in response to determining that a first UI element of the first browser UI is selected for inclusion in the overlay canvas, storing first content data associated with the first UI element and first context data associated with a first context of the first content data to an overlay data structure;
in response to determining that a second UI element of the second browser UI is selected for inclusion in the overlay canvas, storing second content data associated with the second UI element and second context data associated with a second context of the second content data to the overlay data structure;
presenting element data comprising at least one of a first overlay element representing the first UI element or a second overlay element representing the second interface element in the overlay canvas, wherein the presenting the element data includes presenting a representation of the first content data and the first context data, or presenting a representation of the second content data and the second context data; and
presenting a context relationship between a member of the element data and other content data in the overlay canvas, wherein the context relationship is a visual link with textual information that is automatically populated when a new overlay elements is selected;
reorganizing elements presented in the overlay canvas according to a popularity metric;
updating the overlay canvas stored in the overlay data structure with the context relationship;

presenting, in the overlay canvas, a view of a menu comprising multiple overlay contexts comprising a search element and a stored overlay canvas that was previously stored; and in response to selection of one of the multiple overlay contexts, presenting the stored overlay canvas of a selected overlay context; and in response to selection of the search element, presenting a UI search element to search stored overlay data structures.

30. A system, comprising:

a memory to store instructions; and a processor, coupled to the memory, that facilitates execution of the instruction to perform operations, comprising:

presenting a view of an overlay canvas at a portion of a first browser user interface (UI) that is included in a device UI, wherein the first browser UI is associated with a first instance of a browser application;

based on determination that a second browser UI associated with a second instance of the browser application is being concurrently presented on the device UI with the first browser UI, also associating the overlay canvas with the second instance of the browser application;

in response to determining that a first UI element of the first browser UI is selected for inclusion in the overlay canvas, storing first content data associated with the first UI element and first context data associated with a first context of the first content data to an overlay data structure;

in response to determining that a second UI element of the second browser UI is selected for inclusion in the overlay canvas, storing second content data associated with the second UI element and second context data associated with a second context of the second content data to the overlay data structure; and presenting element data comprising at least one of a first overlay element representing the first UI element or a second overlay element representing the second interface element in the overlay canvas, wherein the presenting the element data includes presenting a representation of the first content data and the first context data, or presenting a representation of the second content data and the second context data; and presenting a context relationship between a member of the element data and other content data in the overlay canvas, wherein the context relationship is a visual link with textual information that is automatically populated when a new overlay elements is selected;

reorganizing elements presented in the overlay canvas according to a popularity metric;

updating the overlay canvas stored in the overlay data structure with the context relationship;

presenting, in the overlay canvas, a view of a menu comprising multiple overlay contexts comprising a search element and a stored overlay canvas that was previously stored; and in response to selection of one of the multiple overlay contexts, presenting the stored overlay canvas of a selected overlay context; and in response to selection of the search element, presenting a UI search element to search stored overlay data structures.

31. The method of claim 23, based on a determination that the overlay canvas occludes a bottom portion of the first browser UI, adding a quantity of line breaks after content of a web page displayed in the first browser UI that allows a bottom end portion of the content to be displayed in a non-occluded portion of the first browser UI in response to scrolling.

* * * * *